United States Patent
Iglesias et al.

(10) Patent No.: US 12,252,158 B2
(45) Date of Patent: Mar. 18, 2025

(54) TIME GAPS FOR AUTONOMOUS VEHICLES

(71) Applicant: Waymo LLC, Mountain View, CA (US)

(72) Inventors: Jennifer Iglesias, San Francisco, CA (US); Lucas Watson, Cambridge, MA (US); Tian Yu Liu, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 218 days.

(21) Appl. No.: 17/400,286

(22) Filed: Aug. 12, 2021

(65) Prior Publication Data

US 2023/0047336 A1 Feb. 16, 2023

(51) Int. Cl.
*B60W 60/00* (2020.01)
*B60W 30/095* (2012.01)
*B60W 40/04* (2006.01)
*B60W 50/00* (2006.01)

(52) U.S. Cl.
CPC .. *B60W 60/00274* (2020.02); *B60W 30/0956* (2013.01); *B60W 40/04* (2013.01); *B60W 50/0097* (2013.01); *B60W 60/00272* (2020.02); *B60W 2554/801* (2020.02); *B60W 2554/806* (2020.02)

(58) Field of Classification Search
CPC ....... B60W 60/00274; B60W 30/0956; B60W 40/04; B60W 50/0097; B60W 60/00272; B60W 2554/801; B60W 2554/806
See application file for complete search history.

(56) References Cited

U.S. PATENT DOCUMENTS

| | | | |
|---|---|---|---|
| 11,004,000 B1* | 5/2021 | Gutmann | B60W 60/00272 |
| 11,024,176 B2* | 6/2021 | Jung | G01S 13/865 |
| 11,360,477 B2* | 6/2022 | Kobilarov | G06N 3/08 |
| 11,472,435 B2* | 10/2022 | Lin | G06V 20/58 |
| 11,548,511 B2* | 1/2023 | Parks | G08G 1/167 |
| 11,702,106 B1* | 7/2023 | Poubel Orenstein | B60W 50/0097 701/26 |
| 2007/0115826 A1* | 5/2007 | Chow | H04Q 11/0421 370/235 |
| 2015/0243044 A1* | 8/2015 | Luo | G06T 7/246 382/107 |

(Continued)

*Primary Examiner* — Peter D Nolan
*Assistant Examiner* — Anwar Mohamed
(74) *Attorney, Agent, or Firm* — Botos Churchill IP Law

(57) ABSTRACT

Aspects of the disclosure provide for a method of controlling an autonomous vehicle in an autonomous driving mode. For instance, a predicted future trajectory for an object detected in a driving environment of the autonomous vehicle may be received. A routing intent for a planned trajectory for the autonomous vehicle may be received. The predicted future trajectory and the routing intent intersect with one another may be determined. When the predicted future trajectory and the routing intent are determined to intersect with one another, a time gap may be applied to a predicted future state of the object defined in the predicted future trajectory. A planned trajectory may be determined for the autonomous vehicle based on the applied time gap. The autonomous vehicle may be controlled in the autonomous driving mode based on the planned trajectory.

21 Claims, 12 Drawing Sheets

(56) References Cited

U.S. PATENT DOCUMENTS

| | | | |
|---|---|---|---|
| 2019/0377352 A1* | 12/2019 | Weißwange | B60W 60/0027 |
| 2020/0086855 A1* | 3/2020 | Packer | G08G 1/166 |
| 2020/0387158 A1* | 12/2020 | Kobilarov | G06N 3/04 |
| 2021/0114617 A1* | 4/2021 | Phillips | B60W 30/0956 |
| 2021/0162997 A1* | 6/2021 | Gochev | B60W 60/0027 |
| 2021/0261159 A1* | 8/2021 | Pazhayampallil | B60W 30/0956 |
| 2022/0169281 A1* | 6/2022 | Lin | G06V 20/588 |

* cited by examiner

400

TIME GAPS FOR AUTONOMOUS VEHICLES

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Thus, such vehicles may be largely dependent on systems that are capable of determining the location of the autonomous vehicle at any given time, as well as detecting and identifying objects external to the autonomous vehicle, such as other vehicles, stop lights, pedestrians, etc.

In some instances, an autonomous vehicle's planning system, which generates trajectories for an autonomous vehicle to follow for some period of time into the future, may implement distance thresholds in order to allow the autonomous vehicle to safely drive next to other road users. If such distance thresholds cannot be met, the autonomous vehicle may be slowed down or stopped.

BRIEF SUMMARY

Aspects of the disclosure provide a method of controlling an autonomous vehicle in an autonomous driving mode. The method includes receiving, by one or more processors, a predicted future trajectory for an object detected in a driving environment of the autonomous vehicle; receiving, by the one or more processors, a routing intent for a planned trajectory for the autonomous vehicle; determining that the predicted future trajectory and the routing intent intersect with one another; when the predicted future trajectory and the routing intent are determined to intersect with one another, applying, by the one or more processors, a time gap to a predicted future state of the object defined in the predicted future trajectory; determining, by the one or more processors, a planned trajectory for the autonomous vehicle based on the applied time gap; and controlling, by the one or more processors, the autonomous vehicle in the autonomous driving mode based on the planned trajectory.

In one example, the predicted future state corresponds to an intersection point between the predicted future trajectory and the routing intent. In another example, the method also includes applying the time gap to a plurality of predicted future states of the object defined in the predicted future trajectory. In this example, the method also includes determining whether the object is moving alongside the autonomous vehicle, and wherein applying the time gap to the plurality of predicted future states of the object defined in the predicted future trajectory is further based on the determination of whether the object is moving alongside the autonomous vehicle. In another example, determining the planned trajectory includes attempting to find a trajectory that minimizes encroachment into the time gap. In this example, when unable to find a trajectory that avoids encroaching on the time gap, determining the planned trajectory further includes using a new routing intent. In addition, the method also includes determining whether the object is moving alongside the autonomous vehicle, and wherein using the new routing intent is based on the determination of whether the object is moving alongside the autonomous vehicle. In another example, the time gap includes a first temporal buffer for a passing in front of the object and a second temporal buffer for passing behind the object. In this example, the first temporal buffer is different than the second temporal buffer.

Another aspect of the disclosure provides a system for controlling an autonomous vehicle in an autonomous driving mode. The system includes one or more processors configured to: receive a predicted future trajectory for an object detected in a driving environment of the autonomous vehicle; receive a routing intent for a planned trajectory for the autonomous vehicle; determine that the predicted future trajectory and the routing intent intersect with one another; when the predicted future trajectory and the routing intent are determined to intersect with one another, apply a time gap to a predicted future state of the object defined in the predicted future trajectory; determine a planned trajectory for the autonomous vehicle based on the applied time gap; and control the autonomous vehicle in the autonomous driving mode based on the planned trajectory.

In one example, the predicted future state corresponds to an intersection point between the predicted future trajectory and the routing intent. In another example, the one or more processors are further configured to apply the time gap to a plurality of predicted future states of the object defined in the predicted future trajectory. In another example, the one or more processors are further configured to determine whether the object is moving alongside the autonomous vehicle, and to apply the time gap to the plurality of predicted future states of the object defined in the predicted future trajectory further based on the determination of whether the object is moving alongside the autonomous vehicle. In another example, the one or more processors are further configured to determine the planned trajectory includes by attempting to find a trajectory that minimizes encroachment into the time gap. In this example, the one or more processors are further configured to, when unable to find a trajectory that avoids encroaching on the time gap, determine the planned trajectory further includes using a new routing intent. In addition, the one or more processors are further configured to whether the object is moving alongside the autonomous vehicle, and to use the new routing intent further based on the determination of whether the object is moving alongside the autonomous vehicle. In another example, the time gap includes a first temporal buffer for a passing in front of the object and a second temporal buffer for passing behind the object. In this example, the first temporal buffer is different than the second temporal buffer. In another example, the system also includes the autonomous vehicle.

A further aspect of the disclosure provides a non-transitory computer readable medium on which instructions are stored. The instructions, when executed by one or more processors, cause the one or more processors to perform a method of controlling an autonomous vehicle in an autonomous driving mode. The method includes receiving a predicted future trajectory for an object detected in a driving environment of the autonomous vehicle; receiving a routing intent for a planned trajectory for the autonomous vehicle; determining that the predicted future trajectory and the routing intent intersect with one another; when the predicted future trajectory and the routing intent are determined to intersect with one another, applying a time gap to a predicted future state of the object defined in the predicted future trajectory; determining a planned trajectory for the autonomous vehicle based on the applied time gap; and controlling the autonomous vehicle in the autonomous driving mode based on the planned trajectory.

DETAILED DESCRIPTION

Overview

Figure 1:
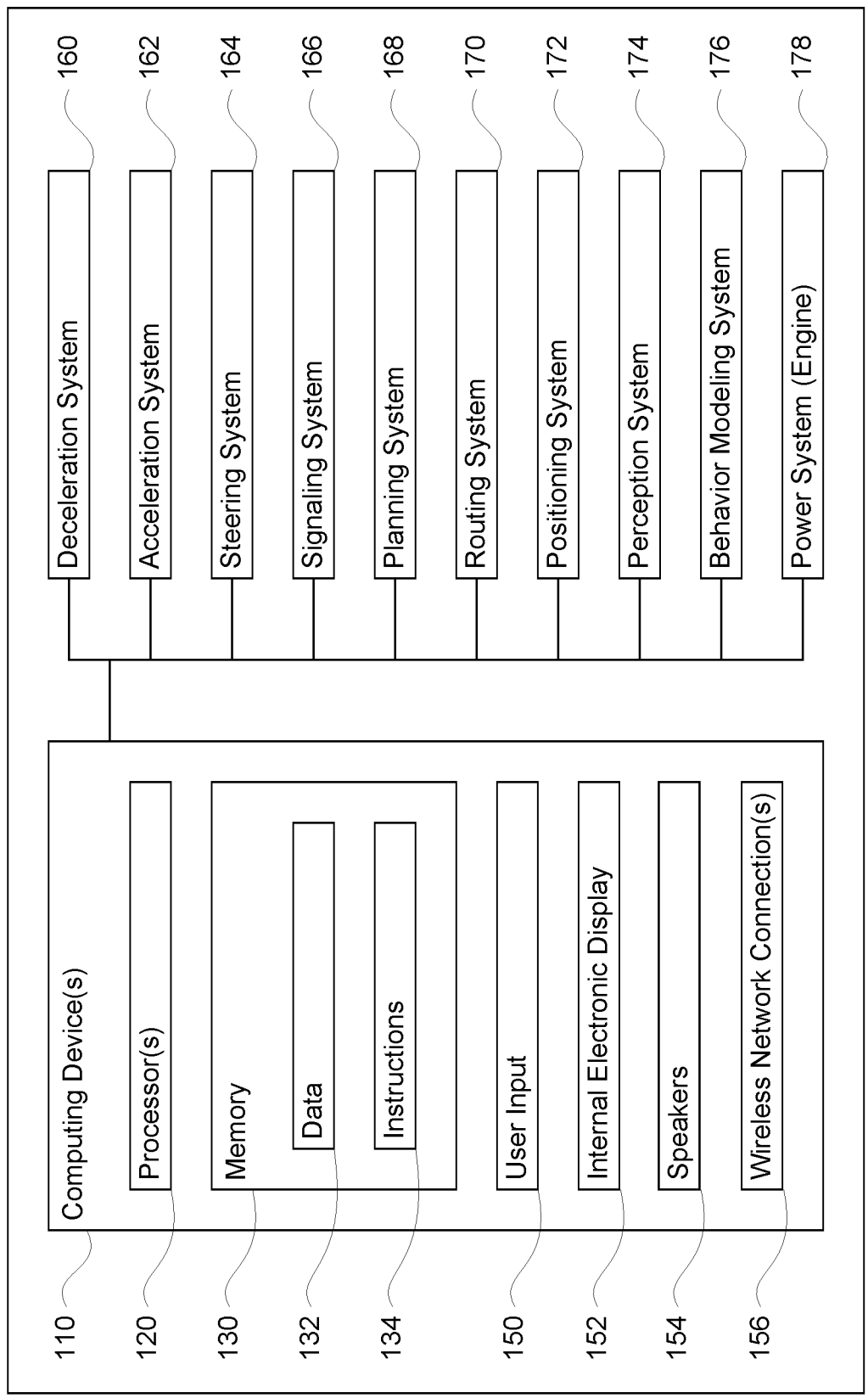
FIG. 1 is a functional diagram of an example vehicle in accordance with an exemplary embodiment.

The technology relates to utilizing time gaps for avoiding interactions with other road users that may be sufficiently distant in space, but not necessarily in time. For instance, at an intersection where another road user, such as another vehicle, is crossing the path of an autonomous vehicle, if the other vehicle has the right of way, typical planning processes may impose a physical limit such as a spatial buffer (e.g. 1 meter, 2 meters or more or less) between the autonomous vehicle and the other vehicle. This may prevent a collision, but may not necessarily cause the autonomous vehicle to control itself in a manner that is appropriate or acceptable to other road users or potential passengers of the autonomous vehicles.

Even though spatial buffers ensure safety, humans may tend to abide by conventions in time in order to maintain comfort to avoid interactions that although physically distant may be very close in time. In other words, the autonomous vehicle may pass through a location on the path of the other vehicle very close in time to when the other vehicle passed through that same location which could cause distress to passengers or other road users (e.g. pedestrians, bicyclists, vehicles, etc.). Moreover, the faster the other vehicle is moving, the closer in time a potential interaction could be. In many cases, making the spatial buffer physically larger may create additional problems especially in higher-traffic (e.g. congested) areas.

In order to address this, time gaps may be imposed on interactions with objects having behavior predictions (e.g. predicted future trajectories) that intersect with a planned future trajectory of an autonomous vehicle. In some instances, when planning future trajectories, an autonomous vehicle's planning system may first plan potential geometry component of the trajectory (which generally follows a routing intent for the autonomous vehicle or rather, a route that the autonomous vehicle should follow to reach a current destination) and thereafter generate potential speed plans for the trajectory. Overall costs for these trajectories may be determined and used to select a trajectory for the autonomous vehicle. In some instances, the routing intent may intersect with the predicted future trajectories of other objects. The speed plan may control when intersections with the predicted trajectory of another road user occurs (e.g. because the autonomous vehicle passes in front of another road user or yields to another road user allowing that other road user to pass in front of the autonomous vehicle).

Time gaps may be enforced by adding temporal buffers to object states along the predicted future trajectories and in some states past locations. Depending on the context of the autonomous vehicle's driving environment, including the relative locations and direction of movement of the object and the autonomous vehicle (e.g. alongside, oncoming, crossing, etc.) as well as the type of the object (e.g. vehicle, bicyclist, pedestrian), the time gaps may be applied differently. For instance, for an object moving alongside the autonomous vehicle (e.g. another vehicle in another lane or a bicyclist and the autonomous vehicle needs to change lanes or cross over a bicycle lane), time buffers may be applied to all of the predicted states of the object along the predicted future trajectory. In this regard, each predicted future trajectory may include a plurality of predictions or predicted object states (e.g. location, orientation, heading, speed, acceleration, etc.) at different points in time. For example, a predicted future trajectory for an object such as a bicyclist may include a series of waypoint states spaced 0.25 second apart over a 10 second prediction period. Thus, for each of these states, a time gap may be considered for object states covering a specific temporal buffer, such as 1 second or more or less. In this regard, the time gap may effectively cause the autonomous vehicle to avoid where the object was or is predicted to be within 1 second.

For an object that is not moving alongside the autonomous vehicle but rather is approaching the autonomous vehicle's current trajectory (e.g. crossing at an intersection), time buffers may be applied to only the predicted states that intersect with the routing intent. As in the example above, the time gap may effectively cause the autonomous vehicle to avoid where the object was or is predicted to be within the specific temporal buffer.

In some instances, the time gap may actually be a pair of temporal buffers which effectively differentiate between when the autonomous vehicle is passing in front of or behind the object. For instance, if the autonomous vehicle passes in front of the object, the temporal buffer may be larger, such as 1 second or more or less, whereas if the autonomous vehicle passes behind the object, the temporal buffer may be smaller, such as 0.5 second or more or less. Such differences may be acceptable, because passing behind an object may be less uncomfortable to that object and passengers of the autonomous vehicle than passing in front. These temporal buffers for the time gaps may be determined empirically, for instance based on research which predicts thresholds for human dread when interacting with other objects while riding in a vehicle or may be hand-tuned and may even differentiate between different types of objects (e.g. pedestrians, bicyclists, and vehicles).

The time gaps may then be used to determine trajectories including speed plans for the geometry component of a trajectory. For example, the speed plans may be required to satisfy the time gaps for each object. In this regard, the speed plan will effectively determine whether the autonomous vehicle yields to the object or passes in front of the object. If no speed plan can be determined, the geometry component may be adjusted until eventually a trajectory that meets any time gaps can be determined. This may be especially useful in situations in which another object is moving alongside the autonomous vehicle (e.g. another vehicle in another lane or a bicyclist and the autonomous vehicle needs to change lanes or cross over a bicycle lane) as it may result in a greater likelihood the autonomous vehicle will yield to the other object.

In some instances, rather than looking for a new geometry (e.g. a new routing intent) if a speed plan cannot be found that satisfies the time gaps, costs for the speed plan may be adjusted such that the greater the encroachment into the time gap, the higher the cost of the trajectory. In this regard, the time gaps can be used to discourage or avoid trajectories which intersect with or encroach upon time gaps while still allowing for encroachment on time gaps in order to reduce the impact of time gaps on the geometry components (e.g. routing intent) of trajectories. This may be especially useful in situations in which the object is approaching the autonomous vehicle's current trajectory (e.g. crossing at an intersection) as this may result in a greater likelihood of the autonomous vehicle being able to make progress at intersections with stop signs.

Moreover, even if the inclusion of time gaps does not change the pass or yield decision with respect to another road user, using time gaps may still cause the autonomous vehicle to be better positioned. For example, with an unprotected left turn with oncoming traffic, with time gaps the staging position of the autonomous vehicle may be more likely to cause the autonomous vehicle to take a wider turn, whereas without time-gaps, the autonomous vehicle may tend to take a narrower turn which may result in staging for the turn at an awkward angle with the front end of the autonomous vehicle pointed into oncoming traffic lanes at certain points in time.

The features described herein may allow autonomous vehicles to utilize time gaps for avoiding interactions with other road users that may be sufficiently distant in space, but not necessarily in time. While spatial buffers may allow autonomous vehicles to avoid collisions with other objects, such time gaps may do so as well while also allowing autonomous vehicles to drive in a more human-like and socially acceptable way. In addition, time gaps may also allow an autonomous vehicle to make tradeoffs when driving around multiple road users, for instance, by balancing encroachment into one road user's time gaps versus another road user's time gaps using costs.

Example Systems

As shown in FIG. 1, an autonomous vehicle 100 in accordance with one aspect of the disclosure includes various components. While certain aspects of the disclosure are particularly useful in connection with specific types of vehicles, the autonomous vehicle may be any type of vehicle including, but not limited to, cars, trucks, motorcycles, buses, recreational vehicles, etc. The autonomous vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the autonomous vehicle 100 and may be capable of communicating with various components of the autonomous vehicle in order to control the autonomous vehicle in an autonomous driving mode. For example, returning to FIG. 1, the computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, the computing devices 110 may interact with deceleration system 160 and acceleration system 162 in order to control the speed of the autonomous vehicle. Similarly, steering system 164 may be used by computing devices 110 in order to control the direction of autonomous vehicle 100. For example, if autonomous vehicle 100 is configured for use on a road, such as a car or truck, the steering system may include components to control the angle of wheels to turn the autonomous vehicle. The computing devices 110 may also use the signaling system 166 in order to signal the autonomous vehicle's intent to other drivers or vehicles, for example, by lighting turn signals or brake lights when needed.

Routing system 170 may be used by the computing devices 110 in order to generate a route to a destination using map information. Planning system 168 may be used by computing devices 110 in order to generate short-term trajectories that allow the autonomous vehicle to follow routes or routing intents generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
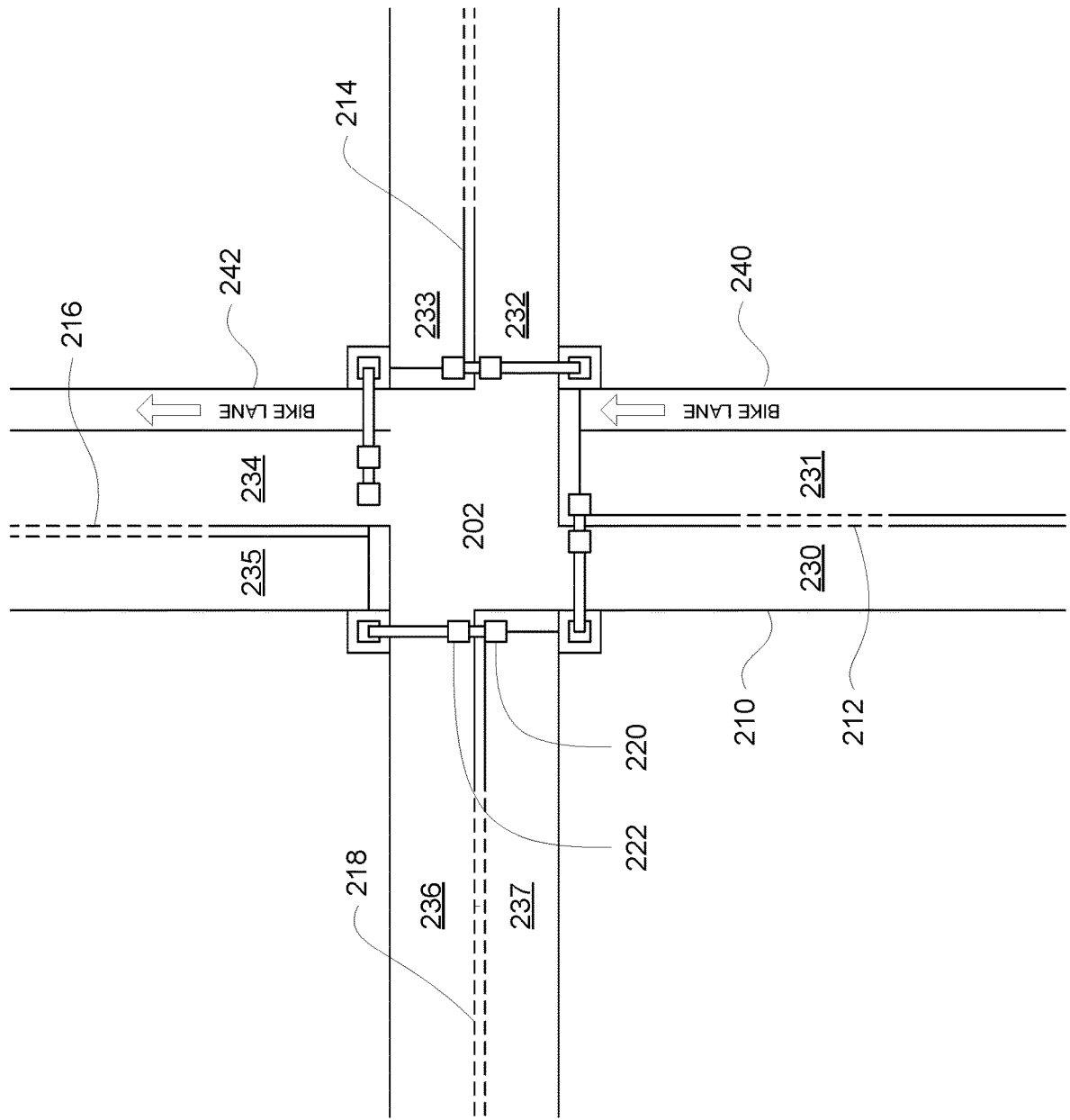
FIG. 2 is an example representation of map information in accordance with aspects of the disclosure.

FIG. 2 is an example of map information 200 for a section of roadway including intersection 202. The map information 200 may be a local version of the map information stored in the memory 130 of the computing devices 110. In this example, the map information 200 includes information identifying the shape, location, and other characteristics of lane lines 210, 212, 214, 216, 218 which define the shape and location of lanes 230, 231, 232, 233, 234, 235, 236, 237. The map information may also store information about the location, shape and configuration of traffic controls such as traffic signal lights 220, 222 as well as stop signs, yield signs, and other signs (not shown). The map information may also include other information that allows the computing devices 110 to determine whether the autonomous vehicle has the right of way to complete a particular maneuver (i.e. complete a turn or cross a lane of traffic or intersection).

In addition, the map information may include additional details such as the characteristics (e.g. shape, location, configuration etc.) of traffic controls including traffic signal lights (such as traffic signal lights 220, 222), signs (such as stop signs, yield signs, speed limit signs, road signs, and so on), crosswalks, sidewalks, curbs, buildings or other monuments, etc. For instance, as shown in FIG. 2, the map information identifies the shape and location of bicycle lanes 240, 242.

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic or traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route or routing intent from a current location (e.g. a location of a current node) to a destination. Route or routing intents may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the autonomous vehicle, etc. Each route or routing intent may include a list of a plurality of nodes and edges which the autonomous vehicle can use to reach the destination. Routes or routing intents may be recomputed periodically as the autonomous vehicle travels to the destination and sent to the planning system 168 in order to plan trajectories.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 172 may be used by computing devices 110 in order to determine the autonomous vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the autonomous vehicle. The location of the autonomous vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/speed detection device to determine the direction and speed of the autonomous vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 174 also includes one or more components for detecting objects external to the autonomous vehicle such as other vehicles, obstacles in the roadway, traffic signals, signs, trees, etc. For example, the perception system 174 may include LIDARs, sonar, radar, cameras and/or any other detection devices that record data which may be processed by the computing devices of the computing devices 110. In the case where the autonomous vehicle is a passenger vehicle such as a minivan, the minivan may include a laser or other sensors mounted on the roof or other convenient location.

Figure 3:
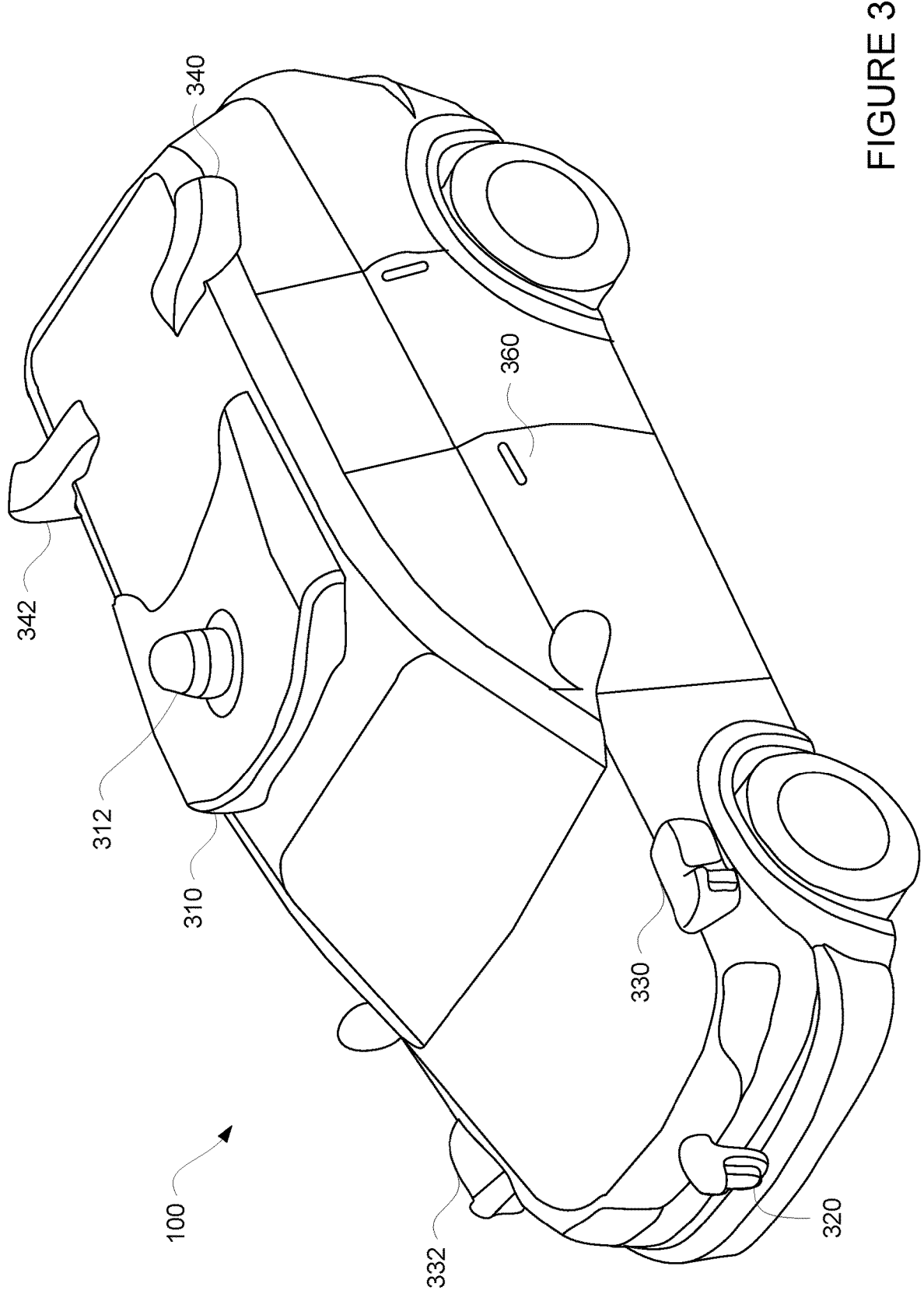
FIG. 3 is an example external view of an autonomous vehicle in accordance with aspects of the disclosure.

For instance, FIG. 3 is an example external view of autonomous vehicle 100. In this example, roof-top housing 310 and dome housing 312 may include a LIDAR sensor as well as various cameras and radar units. In addition, housing 320 located at the front end of autonomous vehicle 100 and housings 330, 332 on the driver's and passenger's sides of the autonomous vehicle may each store a LIDAR sensor. For example, housing 330 is located in front of driver door 360. Autonomous vehicle 100 also includes housings 340, 342 for radar units and/or cameras also located on the roof of autonomous vehicle 100. Additional radar units and cameras (not shown) may be located at the front and rear ends of autonomous vehicle 100 and/or on other positions along the roof or roof-top housing 310.

The computing devices 110 may be capable of communicating with various components of the autonomous vehicle in order to control the movement of autonomous vehicle 100 according to primary vehicle control code of memory of the computing devices 110. For example, returning to FIG. 1, the computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the autonomous vehicle's engine or motor) in order to control the movement, speed, etc. of autonomous vehicle 100 in accordance with the instructions 134 of memory 130.

The various systems of the autonomous vehicle may function using autonomous vehicle control software in order to determine how to and to control the autonomous vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. Such objects may include other road users including other vehicles, pedestrians, bicyclists, etc. The characteristics may include location, type, heading, orientation, speed, acceleration, change in acceleration, size, shape, etc. In this regard, information may include the object's position as well as a three-dimensional polyhedron (e.g. a bounding box) or two-dimensional polygon representing the boundaries of the object. The bounding box or polygon may be represented as a statistical model. The precision of the measurements of the bounding box may be represented as a distribution of possible values having a mean and standard deviation which may suggest how much smaller the bounding box or polygon could be relative to the object.

In some instances, characteristics may be input into a behavior modeling system software module of the behavior modeling system 176 which uses various behavior prediction models based on object type to output a predicted future behavior for a detected object. For instance, the behavior modeling system 176 may output a prediction of where the object is expected to be at various points in time in the future. In this regard, for each road user object, the behavior modeling system 176 may output multiple behavior predictions with individual likelihoods. The error or uncertainty of these predictions may generally increase over time (e.g. into the future). In this regard, the predictions may be defined as a Gaussian distribution over time with mean and standard deviations at each point in time.

In other instances, the characteristics may be put into one or more detection system software modules, such as a traffic light detection system software module configured to detect the states of known traffic signals, construction zone detection system software module configured to detect construction zones from sensor data generated by the one or more sensors of the autonomous vehicle as well as an emergency vehicle detection system configured to detect emergency vehicles from sensor data generated by sensors of the autonomous vehicle. Each of these detection system software modules may use various models to output a likelihood of a construction zone or an object being an emergency vehicle.

Detected objects, predicted future behaviors, various likelihoods from detection system software modules, the map information identifying the autonomous vehicle's environment, position information from the positioning system 170 identifying the location and orientation of the autonomous vehicle, a destination location or node for the autonomous vehicle as well as feedback from various other systems of the autonomous vehicle may be input into a planning system software module of the planning system 168. The planning system 168 may use this input to generate trajectories for the autonomous vehicle to follow for some brief period of time into the future based on a route generated by a routing module of the routing system 170. In this regard, the trajectories may define the specific characteristics of acceleration, deceleration, speed, etc. to allow the autonomous vehicle to follow the route towards reaching a destination. A control system software module of the computing devices 110 may be configured to control movement of the autonomous vehicle, for instance by controlling braking, acceleration and steering of the autonomous vehicle, in order to follow a trajectory.

The computing devices 110 may control the autonomous vehicle in an autonomous driving mode by controlling various components. For instance, by way of example, the computing devices 110 may navigate the autonomous vehicle to a destination location completely autonomously using data from the detailed map information and planning system 168. The computing devices 110 may use the positioning system 170 to determine the autonomous vehicle's location and perception system 174 to detect and respond to objects when needed to reach the location safely. Again, in order to do so, computing devices 110 and/or planning system 168 may generate trajectories and cause the autonomous vehicle to follow these trajectories, for instance, by causing the autonomous vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the autonomous vehicle and the wheels of the autonomous vehicle. Again, by controlling these systems, computing devices 110 may also control the drivetrain of the autonomous vehicle in order to maneuver the autonomous vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 11:
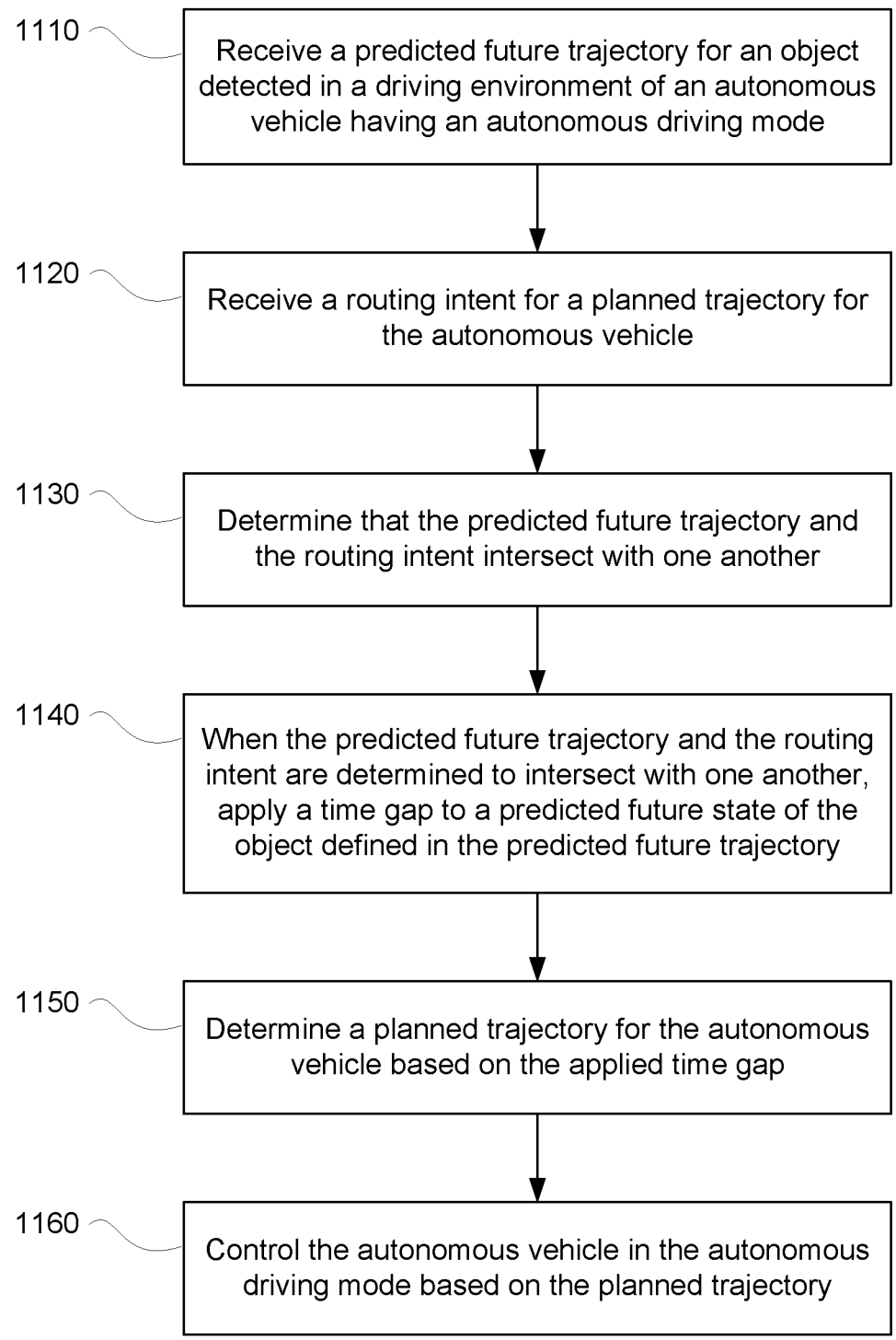
FIG. 11 is an example flow diagram in accordance with aspects of the disclosure.

FIG. 11 is an example flow diagram 1100 for controlling an autonomous vehicle, which may be performed by one or more processors of one or more computing devices, such as one or more of the processors 120 of the computing devices 110, planning system 168, and/or other processors of the various other systems of the autonomous vehicle 100 discussed above.

At block 1110, a predicted future trajectory for an object detected in a driving environment of the autonomous vehicle is received. For instance, the perception system 174 may detect objects and identify their characteristics. These detections and characteristics may be published and sent to other systems of the autonomous vehicle 100 including the behavior modeling system 176 and planning system 168. As noted above, the behavior modeling system may use this information to generate behavior predictions or future trajectories for certain types of objects, including road user objects such as pedestrians, bicyclists, vehicles, etc. The future trajectories be published and sent to other systems of the autonomous vehicle 100 including the planning system 168.

Figure 4:
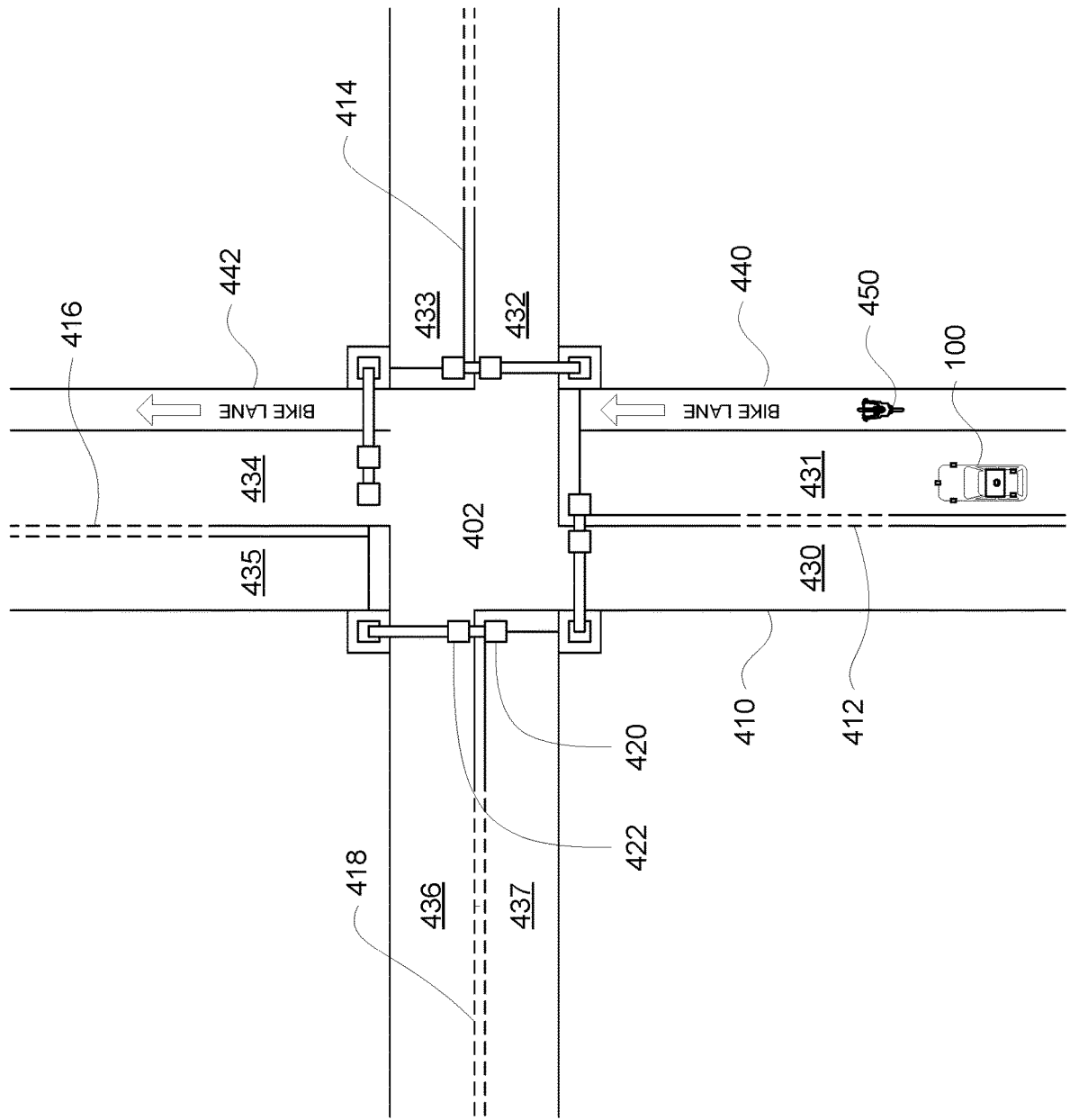
FIG. 4 is an example representation of an autonomous vehicle and a road user object in accordance with aspects of the disclosure.

For example, FIG. 4 depicts a section of roadway 400 corresponding to the map information 200. In this example, the shape, location and configuration of intersection 402 corresponds to the shape, location and configuration of intersection 202, the shape, location and configuration of lane lines 410, 412, 414, 416, 418 corresponds to the shape, location and configuration of lane lines 210, 212, 214, 216, 218, respectively, the shape, location and configuration of lanes 430, 431, 432, 433, 434, 435, 436, 437 corresponds to the shape, location and configuration of lanes 230, 231, 232, 233, 234, 235, 236, 237, respectively, the shape, location and configuration of traffic signal lights 420, 422 correspond to the shape, location and configuration of traffic signal lights 220, 222, respectively, and the shape, location and configuration of bicycle lanes 440, 442 corresponds to the shape, location and configuration of bicycle lanes 240, 242, respectively. In this example, autonomous vehicle 100 is in lane 231 approaching intersection 202, and the vehicle's perception system 168 has detected an object 450 and identified this object as a bicyclist. In this regard, the object 450 is a road user object.

Figure 5:
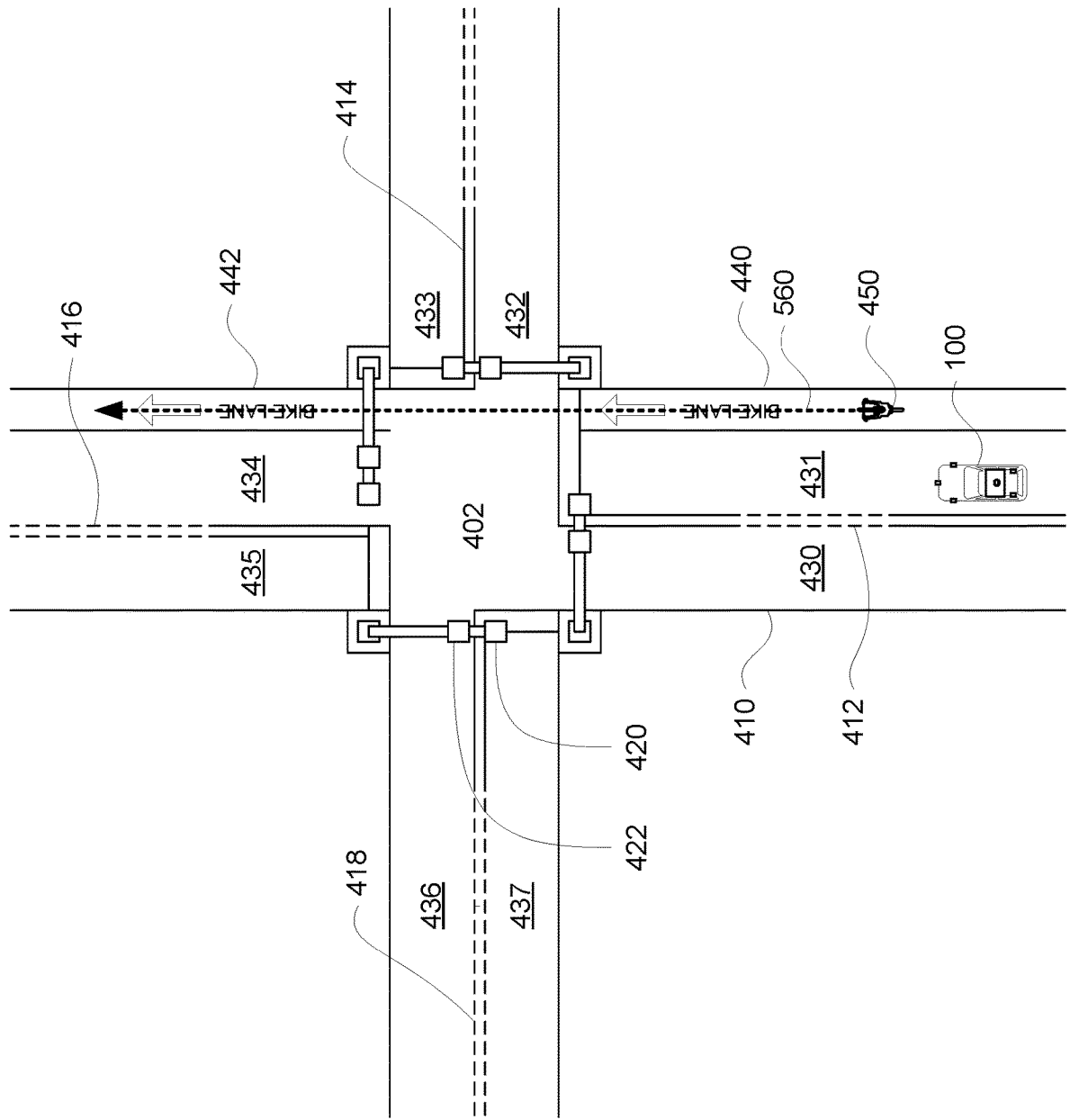
FIG. 5 is an example representation of an autonomous vehicle, a road user object, and a predicted trajectory for the road user object in accordance with aspects of the disclosure.

Once the perception system 168 has detected object 450, its location and other characteristics may be published to other systems of the vehicle including the behavior modeling system 176. The behavior modeling system 176 may generate a predicted trajectory for the object 450 which may be published to other systems of the vehicle including the planning system 174. As shown in FIG. 5, a predicted trajectory 560 has the object 450 traveling in the bicycle lane 440 (bicycle lane 240), through intersection 402 (intersection 202), and continuing in bicycle lane 442 (bicycle lane 242).

In addition, at block 1120, a routing intent for a planned trajectory for the autonomous vehicle is received. As noted above, the routing system 170 may generate routes for the autonomous vehicle 100 to follow from its current location to a destination. This destination may be a pick up or drop off location for a passenger, a maintenance location (e.g. a depot), a staging location (e.g. to wait for a new destination), etc. Such routes may be considered routing intents. The routing intents may be published and sent to other systems of the autonomous vehicle 100 including the planning system 168. As the vehicle moves, the routing intents may be updated periodically, such as several times per second. In that regard, the planning system 168 may use the routing intent as a baseline for generating trajectories for the autonomous vehicle to follow. In most cases, the geometry component of a planned trajectory may correspond to the routing intent used to generate the planned trajectory. However, because the route is a "routing intent" it need not necessarily be followed by the planning system 168, for instance, to avoid a collision with another object or for some other emergent situation.

Figure 6:
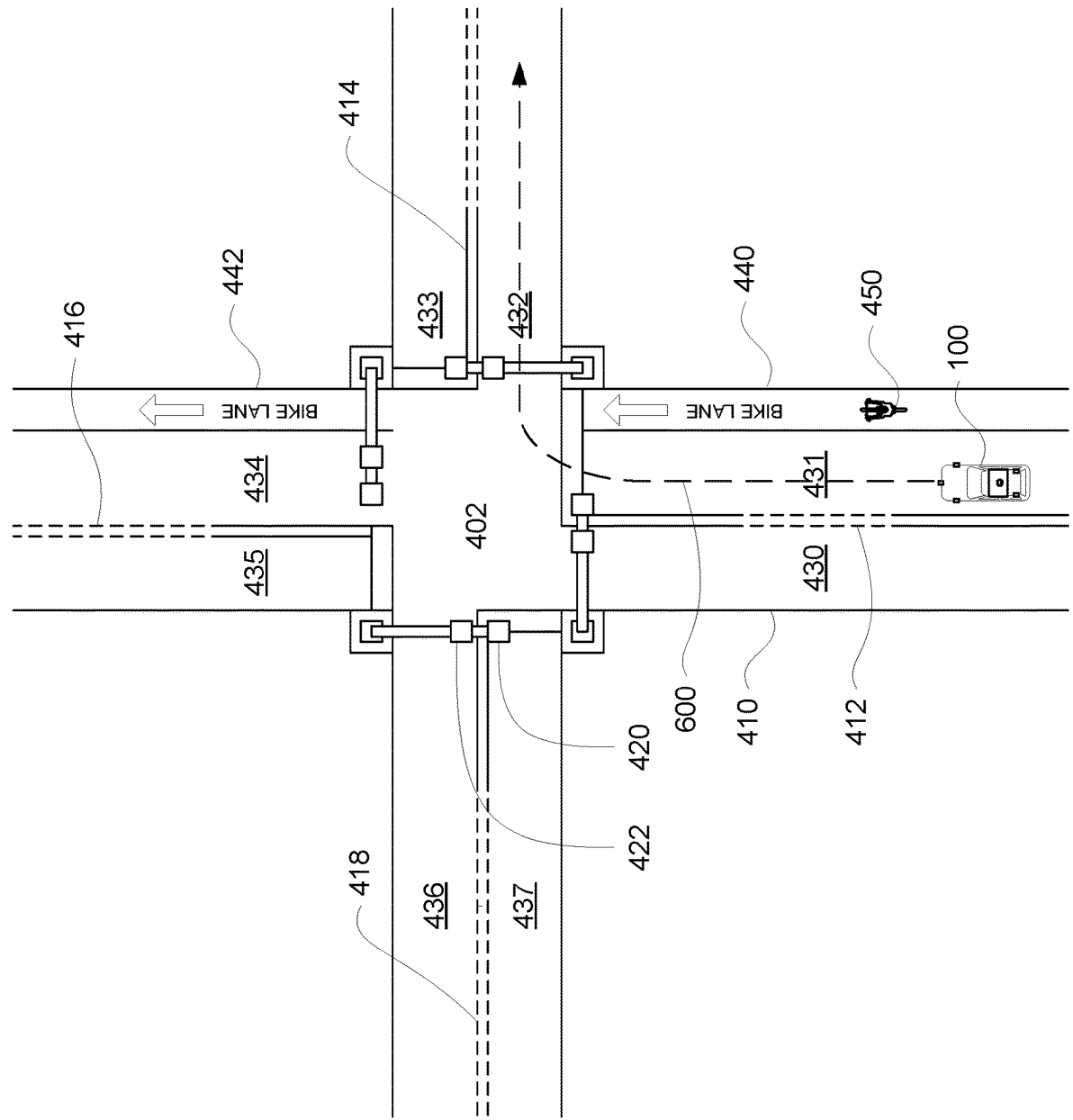
FIG. 6 is an example representation of an autonomous vehicle, a road user object, and a routing intent for the autonomous vehicle in accordance with aspects of the disclosure.

For example, turning to FIG. 6, the routing system 170 may generate a routing intent 600 for the autonomous vehicle 100 to follow from its current location to a destination. In this example, routing intent 600 has the autonomous vehicle following lane 431 (lane 231), making a right turn at intersection 402 (intersection 202), and entering into lane 432 (lane 232).

At block 1130 of FIG. 11, that the predicted future trajectory and the routing intent intersect with one another is determined. For instance, the planning system 168 may determine whether the routing intent intersects with the predicted future trajectories of other objects. As discussed above, time gaps may be imposed on interactions with objects having predicted trajectories that intersect with a planned future trajectory of an autonomous vehicle.

Figure 7:
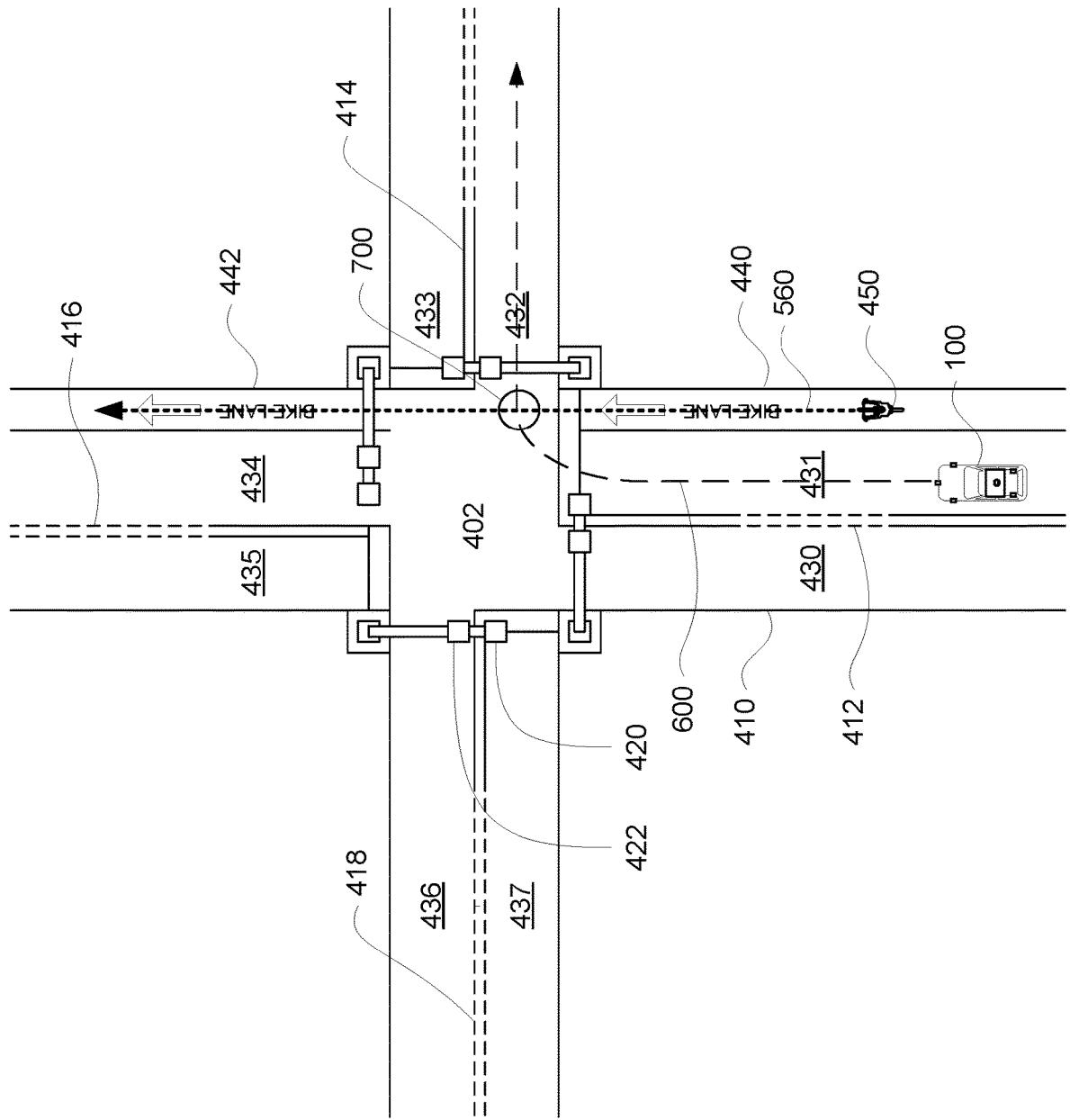
FIG. 7 is an example representation of an autonomous vehicle, a road user object, a predicted trajectory for the road user object, and a routing intent for the autonomous vehicle in accordance with aspects of the disclosure.

FIG. 7 depicts both the predicted trajectory 560 and the routing intent 600. As can be seen, the predicted trajectory 560 and the routing intent 600 intersect within intersection 402 (intersection 202) at an intersection point within open circle 700 (included for reference only).

At block 1140 of FIG. 11, when the predicted future trajectory and the routing intent are determined to intersect with one another, a time gap is applied to a predicted future state of the object defined in the predicted future trajectory. Time gaps may be enforced by adding temporal buffers to object states along the predicted future trajectories and in some states past locations. Depending on the context of the autonomous vehicle's driving environment, including the relative locations and direction of movement of the object and the autonomous vehicle (e.g. alongside, oncoming, crossing, etc.) as well as the type of the object (e.g. vehicle, bicyclist, pedestrian), the time gaps may be applied differently. For instance, for an object moving alongside the autonomous vehicle (e.g. another vehicle in another lane or a bicyclist and the autonomous vehicle needs to change lanes or cross over a bicycle lane), time buffers may be applied to all of the predicted states of the object along the predicted future trajectory. In this regard, each predicted future trajectory may include a plurality of predictions at different points in time. For example, a predicted future trajectory for an object such as a bicyclist may include a series of waypoint states spaced 0.25 second apart over a 10 second prediction period. Thus, for each of these states, a time gap may be considered for object states covering a specific temporal buffer, such as 1 second or more or less. In this regard, the time gap may effectively cause the autonomous vehicle to avoid where the object was or is predicted to be within 1 second.

In some instances, the time gap may actually be a pair of temporal buffers which effectively differentiate between when the autonomous vehicle is passing in front of or behind the object. For instance, if the autonomous vehicle passes in front of the object, the temporal buffer may be larger, such as 1 second or more or less, whereas if the autonomous vehicle passes behind the object, the temporal buffer may be smaller, such as 0.5 second or more or less. Such differences may be acceptable, because passing behind an object may be less uncomfortable to that object and passengers of the autonomous vehicle than passing in front of the object. These temporal buffers for the time gaps may be determined empirically, for instance based on research which predicts thresholds for human dread when interacting with other objects while riding in a vehicle or may be hand-tuned and may even differentiate between different types of objects (e.g. pedestrians, bicyclists, and vehicles). For instance, these temporal buffers may be longer for more vulnerable road users such as pedestrians and bicyclists than for other vehicles.

Figure 8:
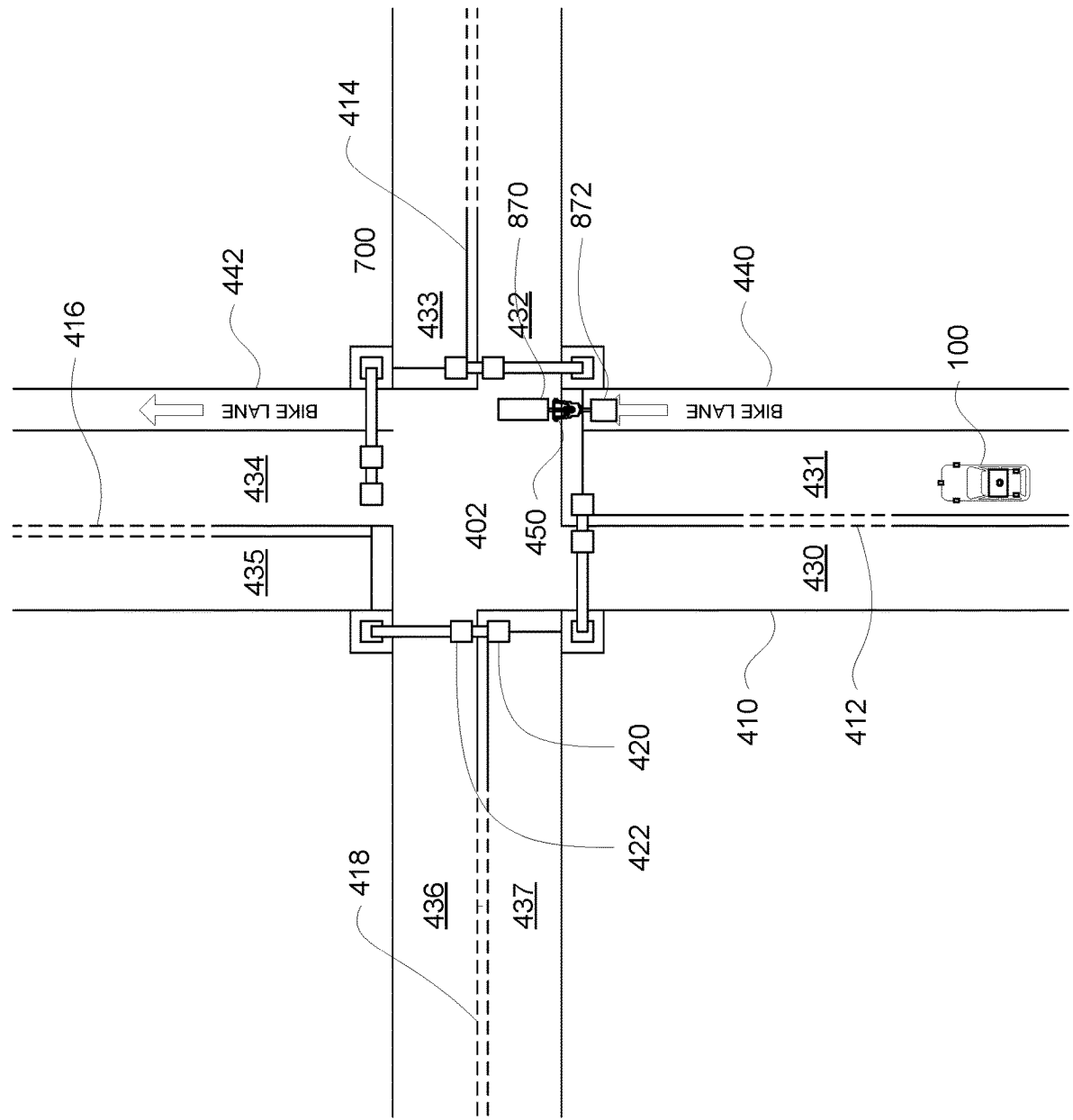
FIG. 8 is an example representation of a road user object at a predicted future location and time buffers in accordance with aspects of the disclosure.

FIG. 8 depicts the object 450 at a waypoint along the predicted trajectory 560. In this example, there are two temporal buffers 870, 872. Although depicted as a two-dimensional shape, again, these shapes represent a period of time (temporal buffer 870) in front of the object 450 which should be avoided and a period of time (temporal buffer 872) behind the object 450 which should be avoided. Temporal buffer 870 is larger relative to temporal buffer 872. This may be duplicated each of a plurality of different waypoints along the predicted trajectory 560.

For an object that is not moving alongside the autonomous vehicle but rather is approaching the autonomous vehicle's current trajectory (e.g. crossing at an intersection), time buffers may be applied to only the predicted states that intersect with the routing intent. As in the example above, the time gap may effectively cause the autonomous vehicle to avoid where the object was or is predicted to be within the specific temporal buffer.

Figure 9:
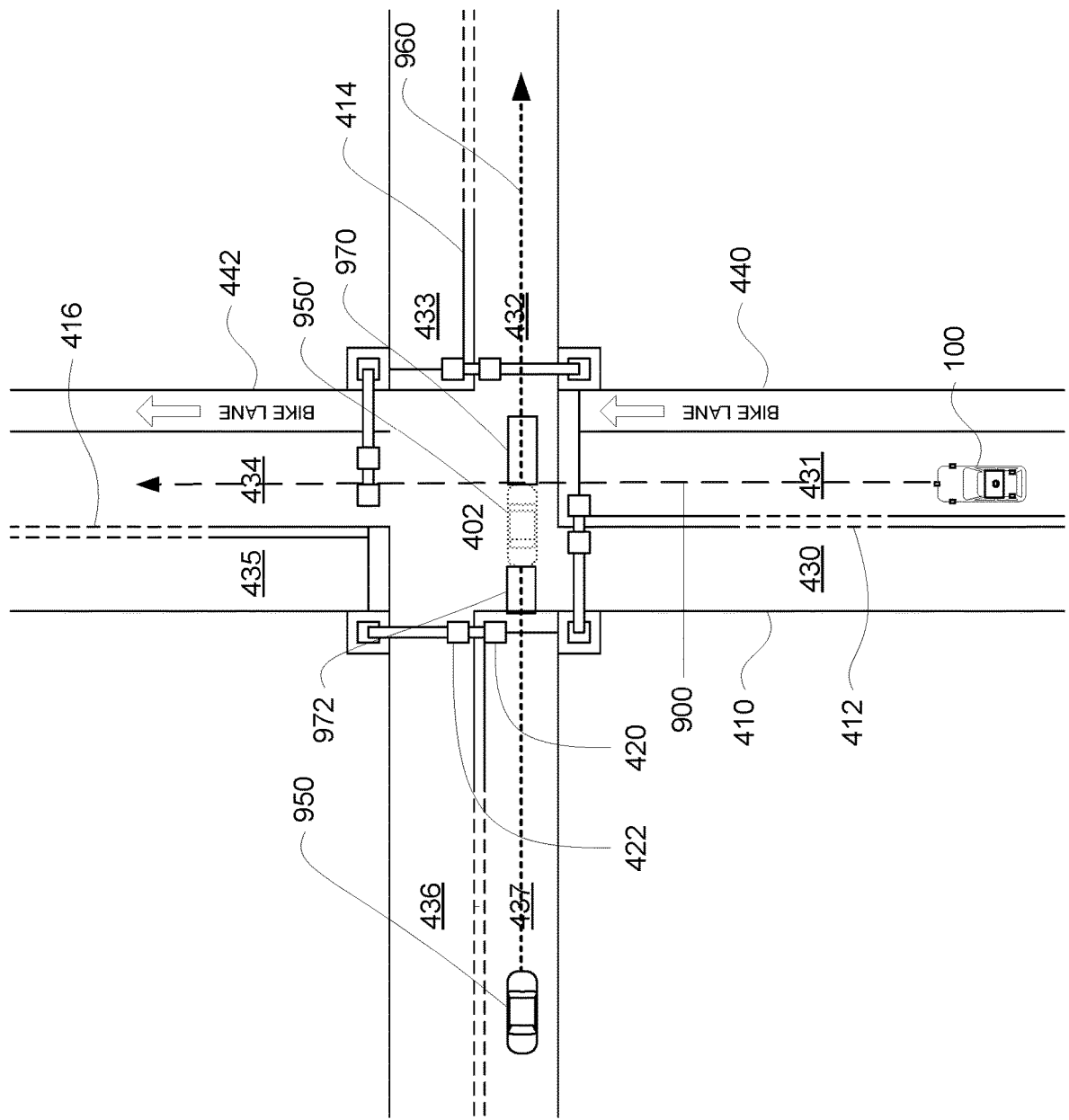
FIG. 9 is an example representation of a road user object at a predicted future location and time buffers in accordance with aspects of the disclosure.
Figure 10A:
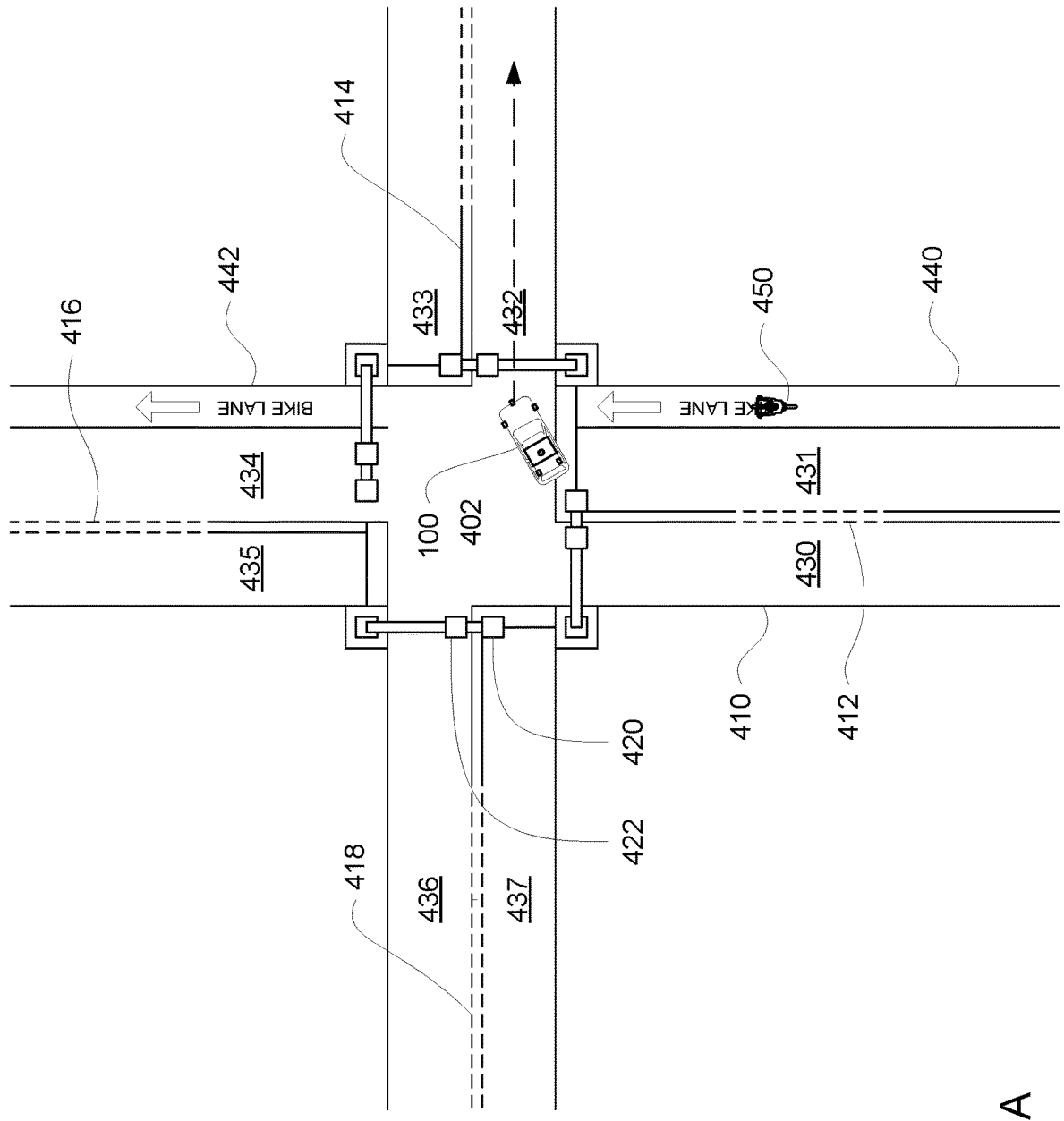
FIG. 10A is an example representation of an autonomous vehicle, a road user object at a predicted future location, and a planned trajectory for the autonomous vehicle in accordance with aspects of the disclosure.
Figure 10B:
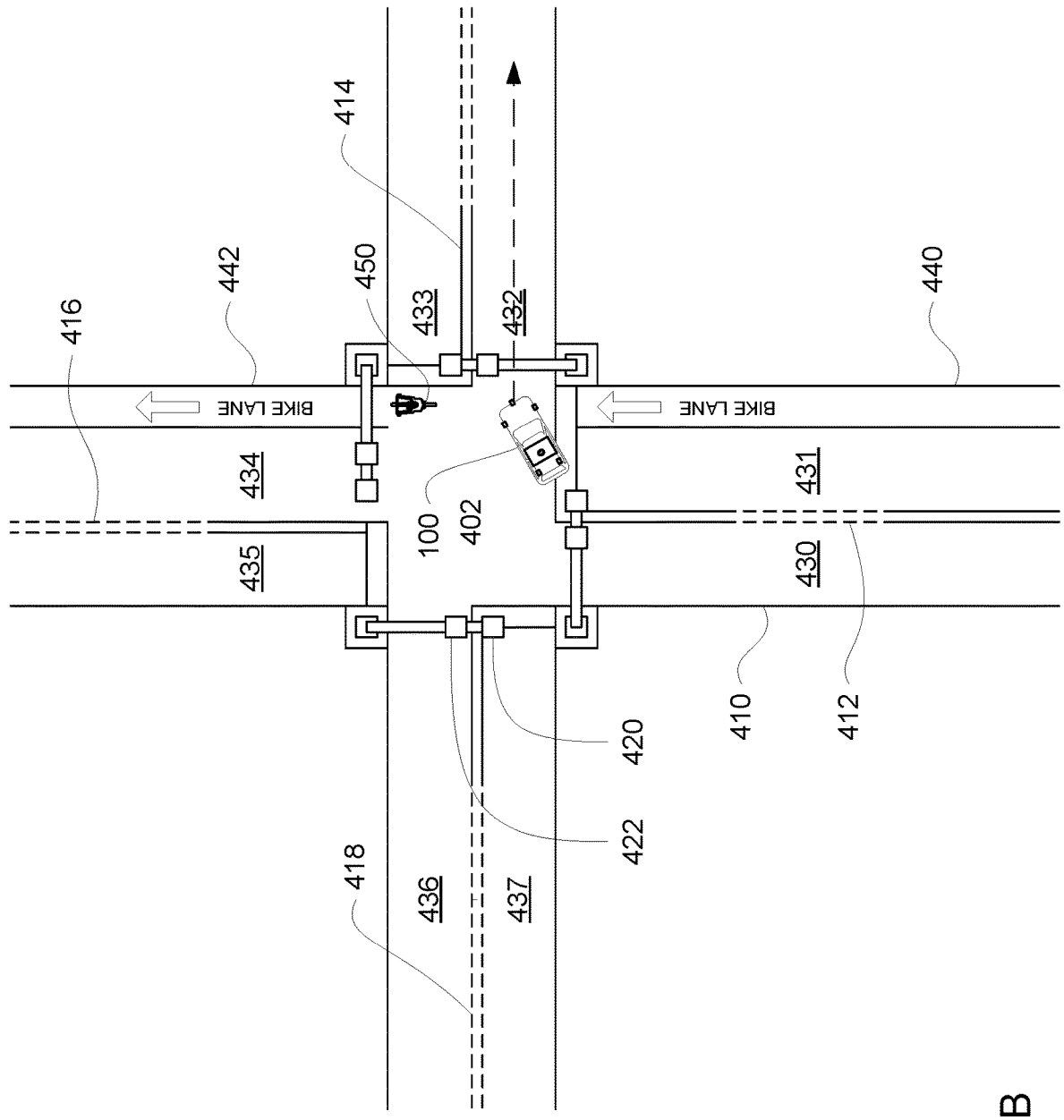
FIG. 10B is an example representation of an autonomous vehicle, a road user object at a predicted future location, and a planned trajectory for the autonomous vehicle in accordance with aspects of the disclosure.

FIG. 9 depicts an object 950 at a waypoint along a predicted trajectory 960 which has the object (here, another vehicle) passing through intersection 202 from lane 437 (lane 237) and entering into lane 432 (lane 232). In this example, the predicted trajectory 960 intersects with the routing intent 600 within the intersection 402 (intersection 202). In this regard, because the predicted trajectory 960 intersects with the routing intent 900 at an intersection point within the intersection 202, the waypoint depicted in FIG. 9 includes the predicted state 950' of the object 950 that intersects with the routing intent 900. Here, there are two temporal buffers 970, 972. Although depicted as a two-dimensional shape, again, these shapes represent a period of time (temporal buffer 970) in front of the object 950 which should be avoided and a period of time (temporal buffer 972) behind the object 950 which should be avoided. Temporal buffer 970 is larger relative to temporal buffer 972.

At block 1150 of FIG. 11, a planned trajectory for the autonomous vehicle is determined based on the applied time gap. For instance, time gaps may be used to determine trajectories including speed plans for the geometry component of a trajectory. In some instances, when planning future trajectories, an autonomous vehicle's planning system may first plan potential geometry component of the trajectory (which generally follows the received routing intent or rather, a route that the autonomous vehicle should follow to reach a current destination) and thereafter generate potential speed plans for the trajectory. Overall costs for these trajectories may be determined and used to select a trajectory for the autonomous vehicle as described above. The speed plan may control when intersections with the predicted trajectory of another road user occurs (e.g. because the autonomous vehicle passes in front of another road user or yields to another road user allowing that other road user to pass in front of the autonomous vehicle another vehicle).

For example, the speed plans may be required to satisfy the time gaps for each object. In this regard, the speed plan will effectively determine whether the autonomous vehicle yields to the object or passes in front of the object. If no speed plan can be determined or if the speed plan is not desirable for some reason, the geometry component may be adjusted until eventually a trajectory that meets any time gaps can be determined. This may be especially useful in situations in which another object is moving alongside the autonomous vehicle (e.g. another vehicle in another lane or a bicyclist and the autonomous vehicle needs to change lanes or cross over a bicycle lane as depicted in the examples of FIGS. 4, 5, 6, 7, 8, 10A and 10B) as it may result in a greater likelihood the autonomous vehicle will yield to the other object. For example, in FIG. 10A, the autonomous vehicle 100 is passing in front of object 450, and in the example of FIG. 10B, the autonomous vehicle 100 is passing behind the object 450 (i.e. has yielded to and allowed the object 450 to pass in front of the autonomous vehicle 100).

In some instances, rather than looking for a new geometry (e.g. a new routing intent) if a speed plan cannot be found that satisfies the time gaps, costs for the speed plan may be adjusted such that the greater the encroachment into the time gap, the higher the cost of the trajectory. In this regard, the time gaps can be used to discourage or avoid trajectories which intersect with or encroach upon time gaps while still allowing for encroachment on time gaps in order to reduce the impact of time gaps on the geometry components (e.g. routing intent) of trajectories. This may be especially useful in situations in which the object is approaching the autonomous vehicle's current trajectory (e.g. crossing at an intersection) as this may result in a greater likelihood of the autonomous vehicle being able to make progress at intersections with stop signs.

In addition, time gaps may allow autonomous vehicles to make tradeoffs when driving around multiple agents. For example, the costs may allow the autonomous vehicle's computing devices to balance encroachment into one road user's time gaps as compared to another road user's time gaps. In this regard, the costs for encroaching upon different road user's time gaps may be different. For example, it may be more costly to encroach upon a pedestrian's time gap as compared to a vehicle's time gaps even if the amount of the encroachment (e.g. amount of time or percentage of the time gap) is the same.

Moreover, even if the inclusion of time gaps does not change the pass or yield (e.g. the autonomous vehicle passing in front of the road user or the autonomous vehicle yielding to allow the road user to pass in front) decision with respect to another road user, using time gaps may still cause the autonomous vehicle to be better positioned. For example, with an unprotected left turn with oncoming traffic, with time gaps the staging position of the autonomous vehicle may be more likely to cause the autonomous vehicle to take a wider turn, whereas without time-gaps, the autonomous vehicle may tend to take a narrower turn which may result in staging for the turn at an awkward angle with the front end of the autonomous vehicle pointed into oncoming traffic lanes at certain points in time.

At block 1160, the autonomous vehicle is controlled in the autonomous driving mode based on the planned trajectory. The selected trajectory (e.g. the trajectory with the lowest cost) can be used to control the autonomous vehicle in an autonomous driving mode. For instance, as noted above, the computing devices 110 may control the various systems of the autonomous vehicle 100 in order to cause the autonomous vehicle to follow the trajectory towards the destination.

The features described herein may allow autonomous vehicles to utilizing time gaps for avoiding interactions with other road users that may be sufficiently distance in space, but not necessarily in time. While spatial buffers may allow autonomous vehicles to avoid collisions with other objects, such time gaps may do so as well while also allowing autonomous vehicles to drive in a more human-like and socially acceptable way. In addition, time gaps may also allow an autonomous vehicle to make tradeoffs when driving around multiple road users, for instance, by balancing encroachment into one road user's time gaps versus another road user's time gaps using costs.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling an autonomous vehicle in an autonomous driving mode, the method comprising:
   receiving, by one or more processors, a predicted future trajectory for an object detected in a driving environment of the autonomous vehicle;
   receiving, by the one or more processors, a routing intent for the autonomous vehicle identifying a route that the autonomous vehicle should follow to reach a current destination of the autonomous vehicle;
   determining that the predicted future trajectory and the routing intent intersect with one another;
   when the predicted future trajectory and the routing intent are determined to intersect with one another, applying, by the one or more processors, a time gap by adding a temporal buffer to a predicted future state of the object defined in the predicted future trajectory;
   after applying the time gap, generating, by the one or more processors, a new trajectory for the autonomous vehicle by adjusting a geometry component of the new trajectory using the time gap in order to avoid where the object was or is predicted to be within the temporal buffer; and
   controlling, by the one or more processors, the autonomous vehicle in the autonomous driving mode based on the new trajectory.

2. The method of claim 1, wherein the predicted future state corresponds to an intersection point between the predicted future trajectory and the routing intent.

3. The method of claim 1, further comprising, applying the time gap to a plurality of predicted future states of the object defined in the predicted future trajectory.

4. The method of claim 3 further comprising, determining whether the object is moving alongside the autonomous vehicle, and wherein applying the time gap to the plurality of predicted future states of the object defined in the predicted future trajectory is further based on the determination of whether the object is moving alongside the autonomous vehicle.

5. The method of claim 1, wherein generating the new trajectory includes attempting to find a trajectory that minimizes encroachment into the time gap.

6. The method of claim 5, wherein when a trajectory that avoids encroaching on the time gap cannot be found, generating the new trajectory further includes using a new routing intent.

7. The method of claim 6 further comprising, determining whether the object is moving alongside the autonomous vehicle, and wherein using the new routing intent is based on the determination of whether the object is moving alongside the autonomous vehicle.

8. The method of claim 1, wherein the temporal buffer is a first temporal buffer for passing in front of the object and the time gap further a second temporal buffer for passing behind the object, wherein each of the first and second temporal buffers is a specific amount of time.

9. The method of claim 8, wherein the first temporal buffer is different than the second temporal buffer.

10. A system comprising one or more processors configured to:
    receive a predicted future trajectory for an object detected in a driving environment of an autonomous vehicle having an autonomous driving mode;
    receive a routing intent for the autonomous vehicle identifying a route that the autonomous vehicle should follow to reach a current destination of the autonomous vehicle;

determine that the predicted future trajectory and the routing intent intersect with one another;

when the predicted future trajectory and the routing intent are determined to intersect with one another, apply a time gap by adding a temporal buffer to a predicted future state of the object defined in the predicted future trajectory;

after applying the time gap, generate a new trajectory for the autonomous vehicle by adjusting a geometry component of the new trajectory using the time gap in order to avoid where the object was or is predicted to be within the temporal buffer; and control the autonomous vehicle in the autonomous driving mode based on the new trajectory.

11. The system of claim 10, wherein the predicted future state corresponds to an intersection point between the predicted future trajectory and the routing intent.

12. The system of claim 10, wherein the one or more processors are further configured to apply the time gap to a plurality of predicted future states of the object defined in the predicted future trajectory.

13. The system of claim 12, wherein the one or more processors are further configured to determine whether the object is moving alongside the autonomous vehicle, and to apply the time gap to the plurality of predicted future states of the object defined in the predicted future trajectory further based on the determination of whether the object is moving alongside the autonomous vehicle.

14. The system of claim 10, wherein the one or more processors are further configured to determine the new trajectory includes by attempting to find a trajectory that minimizes encroachment into the time gap.

15. The system of claim 14, wherein the one or more processors are further configured to, when unable to find a trajectory that avoids encroaching on the time gap, determine the new trajectory further includes using a new routing intent.

16. The system of claim 15, wherein the one or more processors are further configured to whether the object is moving alongside the autonomous vehicle, and to use the new routing intent further based on the determination of whether the object is moving alongside the autonomous vehicle.

17. The system of claim 10, wherein the temporal buffer is a first temporal buffer for passing in front of the object and the time gap further includes a second temporal buffer for passing behind the object, wherein each of the first and second temporal buffers is a specific amount of time.

18. The system of claim 17, wherein the first temporal buffer is different than the second temporal buffer.

19. The system of claim 10, further comprising the autonomous vehicle.

20. A non-transitory computer readable medium on which instructions are stored, the instructions, when executed by one or more processors, cause the one or more processors to perform a method, the method comprising:

receiving a predicted future trajectory for an object detected in a driving environment of an autonomous vehicle having an autonomous driving mode;

receiving a routing intent for the autonomous vehicle identifying a route that the autonomous vehicle should follow to reach a current destination of the autonomous vehicle;

determining that the predicted future trajectory and the routing intent intersect with one another;

when the predicted future trajectory and the routing intent are determined to intersect with one another, applying a time gap by adding a temporal buffer to a predicted future state of the object defined in the predicted future trajectory;

after applying the time gap, generating a new trajectory for the autonomous vehicle by adjusting a geometry component of the new trajectory using the time gap in order to avoid where the object was or is predicted to be within the temporal buffer; and controlling the autonomous vehicle in the autonomous driving mode based on the new trajectory.

21. The method of claim 1, wherein generating the new trajectory includes generating a speed plan using the time gap and the adjusted geometry component.

* * * * *